June 7, 1927.
J. LANTAGNE
1,631,827
MEAT JACK
Filed Dec. 2, 1926
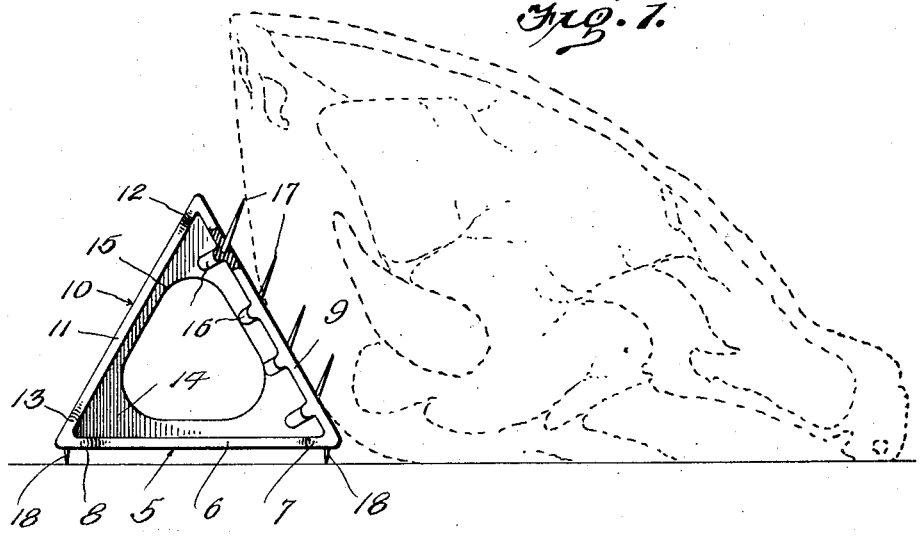
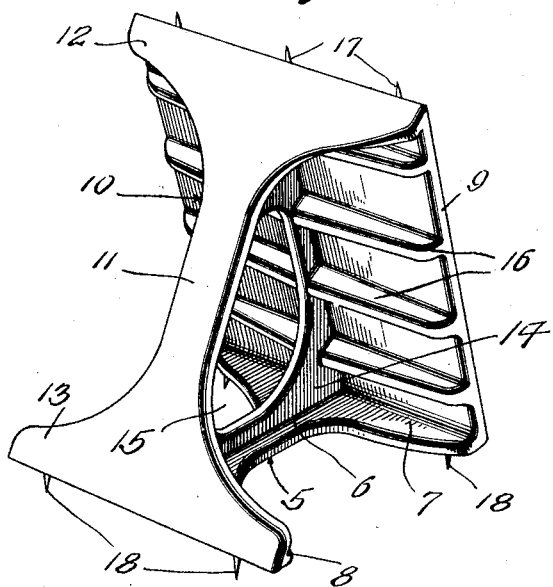
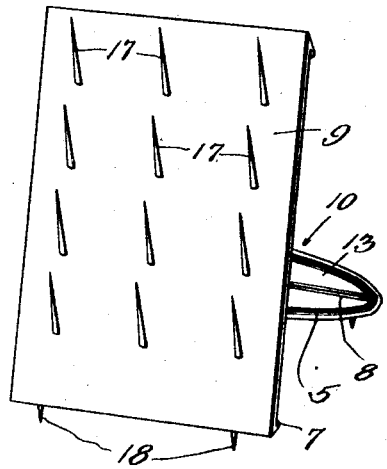
Inventor
Joseph Lantagne Patented June 7, 1927.

1,631,827

UNITED STATES PATENT OFFICE.

JOSEPH LANTAGNE, OF CENTERDALE, RHODE ISLAND.

MEAT JACK.

Application filed December 2, 1926. Serial No. 152,221.

The invention aims to provide a new and improved meat "jack" for assisting in holding large pieces of meat upon a butcher's block or similar support, so that the sawing of the meat bones may be much more easily effected.

With the foregoing in view, the invention resides in the novel subject matter hereinafter described and claimed, the description being supplemented by the accompanying drawing.

Fig. 1 is a side elevation partly broken away and in section showing the use of the invention, the piece of meat being shown in dotted lines.

Figs. 2 and 3 are perspective views of the "jack" looking in different directions.

The preferred form of construction has been herein illustrated and while this construction will be specifically described, it is to be understood that within the scope of the invention as claimed, minor variations may be made.

The major portion of the device is formed of a metal casting. This casting embodies a horizontal base 5 having a narrow intermediate portion 6 and widened ends 7 and 8 respectively. An inclined plate 9 of rectangular form, has its lower end integrally joined to the end 7 of the base 5, and an inclined brace 10 is integrally joined at its lower end to the end 8 of the base 5, while the upper end of said brace is integrally joined to the upper end of the plate 9. This brace consists of a narrow intermediate portion 11 and widened upper and lower ends 12 and 13 respectively.

A vertical web 14 extends throughout the lengths of and is integrally joined to the base 5, the plate 9, and the brace 10, said web being disposed in a plane centrally between the vertical edges of said plate. For the sake of lightness, this web is preferably formed with an opening 15, and this opening also permits the narrow intermediate portion of the brace 10 to be readily gripped by hand, when moving the device from one place to another.

Vertically spaced ribs 16 are formed integrally with the rear side of the plate 9 and extend horizontally from the web 14 to the outer edges of said plate, the inner ends of said ribs being integrally joined to the web.

The plate 9 is provided with a plurality of upstanding prongs 17 to penetrate the meat, and the lower ends of these prongs are embedded in the ribbed portions of the plate, as will be clear from Fig. 1. These ribs not only generally stiffen and reinforce the plate, but provide a sufficient body of metal in which to effectively embed and anchor the lower ends of the prongs 17.

The base 5 is provided with a plurality of downwardly projecting prongs 18 to engage a butcher's block or similar support upon which the device may be used. As these prongs prevent the entire jack from sliding upon the support, and the prongs 17 tenaciously connect the piece of meat with the jack, the meat may be easily cut and sawed, without encountering the difficulties which now necessarily obtain.

The exact details herein disclosed have proven highly efficient and such details are therefore preferably followed. However, within the scope of the invention as claimed, variations may be made.

I claim:

1. A meat "jack" comprising a body having a pronged base portion to rest on a butcher's block or other support, and an inclined meat-engaging portion, the latter being provided with meat penetrating prongs.

2. A meat "jack" comprising an inclined plate having meat penetrating prongs, and a prong-supporting base rigid with said plate and itself provided with prongs, the latter being adapted to anti-slippingly engage a butcher's block or other support.

3. In a meat "jack", a metal casting consisting of a base, an inclined plate integral at its lower end with one end of said base, an inclined brace integrally joined at its lower end to the other end of the base and similarly joined at its upper end to the plate, and a vertical web surrounded by and integrally joined to said base, plate and brace.

4. A meat "jack" comprising a metal casting consisting of a horizontal base having a narrow intermediate portion and widened end portions, a rectangular inclined plate having its lower end integrally joined to one of said widened ends of the base, an inclined brace having its lower end integrally joined to the other of said widened ends of the base and having its upper end integrally joined to the upper end of said plate, said brace consisting of a narrow intermediate portion and widened end portions, a vertical web integrally joined to and surrounded by said base, plate and brace, said web being disposed in a plane midway between the longitudinal edges of the base, plate and brace, and horizontal vertically spaced ribs integral with the inner side of said plate and having their inner ends integrally joined to said web; together with meat penetrating prongs having their lower ends embedded in the ribbed portions of said plate.

In testimony whereof I have hereunto affixed my signature.

JOSEPH LANTAGNE.